United States Patent
Cohn et al.

(10) Patent No.: US 8,836,467 B1
(45) Date of Patent: Sep. 16, 2014

(54) METHOD, SYSTEM AND APPARATUS FOR AUTOMATED REPORTING OF ACCOUNT AND SENSOR ZONE INFORMATION TO A CENTRAL STATION

(75) Inventors: Alan Wade Cohn, Austin, TX (US); Gary Robert Faulkner, Austin, TX (US); James Edward Kitchen, Austin, TX (US); David Leon Proft, Austin, TX (US); Corey Wayne Quain, Lago Vista, TX (US)

(73) Assignee: iControl Networks, Inc., Redwood City, CA (US)

( * ) Notice: Subject to any disclaimer, the term of this patent is extended or adjusted under 35 U.S.C. 154(b) by 394 days.

(21) Appl. No.: 12/892,303

(22) Filed: Sep. 28, 2010

(51) Int. Cl.
G05B 23/02 (2006.01)

(52) U.S. Cl.
USPC .......................................................... 340/3.32

(58) Field of Classification Search
USPC ........................ 340/3.32, 3.31, 3.43, 4.61, 5.1
See application file for complete search history.

(56) References Cited

U.S. PATENT DOCUMENTS

| | | | | |
|---|---|---|---|---|
| 6,553,336 | B1 * | 4/2003 | Johnson et al. ................ 702/188 |
| 7,250,859 | B2 | 7/2007 | Martin et al. ............ 340/539.19 |
| 2003/0062997 | A1 | 4/2003 | Naidoo et al. ................. 340/531 |
| 2004/0117462 | A1 | 6/2004 | Bodin et al. ................... 709/220 |
| 2004/0117465 | A1 | 6/2004 | Bodin et al. ................... 709/222 |
| 2005/0216580 | A1 | 9/2005 | Raji et al. ....................... 709/223 |
| 2005/0276389 | A1 | 12/2005 | Hinkson et al. ................. 379/37 |
| 2006/0051122 | A1 | 3/2006 | Kawazu et al. ................. 399/88 |
| 2006/0067484 | A1 | 3/2006 | Elliot et al. ..................... 379/37 |
| 2006/0078344 | A1 | 4/2006 | Kawazu et al. ................. 399/69 |
| 2009/0066789 | A1 | 3/2009 | Baum et al. .................... 348/143 |
| 2009/0070436 | A1 | 3/2009 | Dawes et al. .................. 709/219 |
| 2009/0070477 | A1 | 3/2009 | Baum et al. .................... 709/231 |
| 2009/0070681 | A1 | 3/2009 | Dawes et al. .................. 715/736 |
| 2009/0070682 | A1 | 3/2009 | Dawes et al. .................. 715/736 |
| 2009/0070692 | A1 | 3/2009 | Dawes et al. .................. 715/764 |
| 2009/0074184 | A1 | 3/2009 | Baum et al. .................... 380/205 |
| 2009/0077167 | A1 | 3/2009 | Baum et al. .................... 709/203 |
| 2009/0077622 | A1 | 3/2009 | Baum et al. ........................ 726/1 |
| 2009/0077623 | A1 | 3/2009 | Baum et al. ........................ 726/1 |
| 2009/0077624 | A1 | 3/2009 | Baum et al. ........................ 726/1 |
| 2009/0134998 | A1 | 5/2009 | Baum et al. ................ 340/539.1 |

(Continued)

FOREIGN PATENT DOCUMENTS

FR 2 584 217 1/1987
WO WO 99/34339 7/1999

(Continued)

OTHER PUBLICATIONS

"Control Panel Standard—Features for False Alarm Reduction," The Security Industry Association, © SIA 2009, pp. 1-48.

Primary Examiner — Vernal Brown
(74) Attorney, Agent, or Firm — Gregory & Sawrie LLP

(57) ABSTRACT

A mechanism is provided for receiving sensor configuration information from a remote security, monitoring and automation (SMA) controller, storing that sensor configuration information, and transmitting the sensor configuration information to a remote central station alarm monitoring system in a form usable by the remote central station. In addition, a mechanism is provided for receiving account configuration information from a remote node, storing that account configuration information, and transmitting the account configuration information to the remote central station in a form usable by that remote central station. In this manner, inefficiencies during installation and modification of a security system using the SMA controller can be avoided through automated provision of the information.

25 Claims, 12 Drawing Sheets

(56) References Cited

U.S. PATENT DOCUMENTS

2009/0138600 A1  5/2009  Baum et al. .................. 709/226
2009/0138958 A1  5/2009  Baum et al. .................. 726/12
2009/0165114 A1  6/2009  Baum et al. .................. 726/12

FOREIGN PATENT DOCUMENTS

| WO | WO 2004/098127 | 11/2004 |
| WO | WO 2005/091218 | 9/2005 |
| WO | WO 2009/006670 | 1/2009 |

* cited by examiner

METHOD, SYSTEM AND APPARATUS FOR AUTOMATED REPORTING OF ACCOUNT AND SENSOR ZONE INFORMATION TO A CENTRAL STATION

FIELD OF THE INVENTION

Embodiments of the present invention relate generally to the field of home security monitoring and automation, and specifically to automated reporting of subscriber account information and sensor zone information from a server associated with a provider of security services to an alarm central station.

BACKGROUND OF THE INVENTION

Residential electronics and control standards provide an opportunity for a variety of options for securing, monitoring, and automating residences. Wireless protocols for transmission of security information permit placement of a multitude of security sensors throughout a residence without a need for running wires back to a central control panel. Inexpensive wireless cameras also allow for placement of cameras throughout a residence to enable easy monitoring of the residence. A variety of home automation control protocols have also been developed to allow for centralized remote control of lights, appliances, and environmental apparatuses (e.g., thermostats). Traditionally, each of these security, monitoring and automation protocols require separate programming, control and monitoring stations. To the extent that home automation and monitoring systems have been coupled to home security systems, such coupling has involved including the automation and monitoring systems as slaves to the existing home security system. This limits the flexibility and versatility of the automation and monitoring systems and ties such systems to proprietary architectures.

A security system alerts occupants of a dwelling and emergency authorities of a violation of premises secured by the system. A typical legacy security system includes a controller connected by wireless or wired connections to sensors deployed at various locations throughout the secured dwelling. In a home, sensors are usually deployed in doorways, windows, and other points of entry. Motion sensors can also be placed strategically within the home to detect unauthorized movement, while smoke and heat sensors can detect the presence of fire.

A home monitoring system provides an ability to monitor a status of a home so that a user can be made aware of any monitored state changes. For example, when a sensor is tripped, real-time alerts and associated data such as video or photo clips can be sent to the user (e.g., to a network-connected computer or to a mobile device).

A home automation system enables automation and remote control of lifestyle conveniences such as lighting, heating, cooling, and appliances. Typically these various lifestyle conveniences are coupled to a controller via wireless or wired communications protocols. A central device is then used to program the various lifestyle conveniences.

Rather than having multiple devices to control each of the security, monitoring and automation environments, it is desirable to have a centralized controller capable of operating in each environment, thereby reducing the equipment needed in a dwelling. It is further desirable for such a controller to function as a gateway for external network access so that a user can control or monitor devices in locations remote from the dwelling. It is further desirable for such a combined controller and gateway to provide configurable flexibility in how devices in the various environments are monitored and controlled.

The flexibility offered by such a configurable controller suggests that a variety of sensors, monitoring devices and automation devices can be needed for any specific installation in a residence or other secured environment. Typically, security sensors are identified with locations in secured premises by being identified with zone information. Zone information includes not only location within premises but also a sensor type. In order for an alarm monitoring central station to be able to properly notify responders to a sensor alarm event, the central station must be informed about the sensor zone configuration of the security system. Typically, a central station is informed of sensor zone information by an installing technician through the use of a telephone communication or a separate login to the central station, which is time and resource consuming. For example, as much as half of an installation time can be consumed with interaction between the installing technician and the central station, much of which is exchange of sensor and zone configuration information.

It is therefore desirable for a controller to provide automated reporting of configuration of sensors coupled to the controller and their associated zones to not only a provider of the security, monitoring and automation controller but also that a central station responsible for reporting sensor alarm events to responders receive that information as well. In addition, it is also desirable for subscriber account information to be provided to the central station. Subscriber account information can include information about the subscriber needed by the central station, as well as alarm contacts, secret words, and other passwords.

SUMMARY OF THE INVENTION

Embodiments of the present invention provide a single platform that provides controller functionality for each of security, monitoring and automation, as well as providing a capacity to function as a bidirectional Internet gateway. Embodiments of the present provide such functionality by virtue of a configurable architecture that enables a user to adapt the system for the user's specific needs. Embodiments of the present invention further provide for the configurable controller to automatically transmit configuration information related to sensors and other devices coupled to the configurable controller to a provider server for storage and other manipulation. Embodiments of the present invention further provide for the provider server to report sensor and sensor zone configuration information, as well as subscriber account information, to a central station alarm monitoring system configured to alert responders in the event of a sensor alarm event.

In one embodiment of the present invention, a mechanism is provided for receiving sensor configuration information from a remote security, monitoring and automation (SMA) controller, storing that sensor configuration information, translating the sensor configuration information to a form compatible with a remote central station, and transmitting the translated sensor configuration information to the remote central station. In one aspect of the above embodiment, the sensor configuration information is stored using a database record associated with an account identifier identifying a subscriber associated with the SMA controller. In a further aspect, the account identifier is translated to a corresponding account identifier configured on the remote central station and provided with the translated sensor configuration information.

In another aspect of the above embodiment, a web service is used to transmit the translated sensor configuration information. In yet another aspect of the above embodiment, the sensor configuration information includes one or more sensor identifiers and one or more zones associated with the sensor identifiers.

In another aspect of the above embodiment, account configuration information is received and stored, the account configuration information is translated to a format compatible with the remote central station and then transmitted to the remote central station. Account configuration information can include an account identifier, one or more account configuration parameters, an SMA controller identifier, account passwords or other tokens, emergency contacts, and the like. A further aspect provides for storing the account configuration information by creating a new record for an account identifier not previously stored, and for modifying a previously stored record for a previously stored account identifier. Storing of account configuration information can be in a database record, for example. When transmitting new account configuration information to the remote central station, a new account create parameter can be included with the transmission to indicate that the record is a new record.

The foregoing is a summary and thus contains, by necessity, simplifications, generalizations and omissions of detail. Consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a single platform that provides controller functionality for each of security, monitoring and automation, as well as providing a capacity to function as a bidirectional Internet gateway. Embodiments of the present invention provide such functionality by virtue of a configurable architecture that enables a user to adapt the system for the user's specific needs. Embodiments of the present invention further provide for one or more server systems residing in a provider controlled operator domain that provide configuration storage, account information, storage and correlation with security, monitoring and automation controllers, and portal services for subscribers. Embodiments of the present invention also provide for these servers to communicate account and sensor configuration information with a central station alarm monitoring system configured to notify the responders of sensor alarm events.

Architectural Overview

Embodiments of the configurable security, monitoring and automation (SMA) controller of the present invention provide not only for communicating with and interpreting signals from sensors and devices within a dwelling, but also for accessing and monitoring those sensors and devices from locations remote to the dwelling. Embodiments of the SMA controller provide such capability through linkages to external servers via access networks such as the Internet, provider network, or a cellular network. The external servers provide a portal environment through which a user can, for example, monitor the state of sensors coupled, directly or indirectly, to the SMA controller in real-time, configure the controller, and provide controlling information to the SMA controller. The servers can further automatically provide information to a user via remote devices such as mobile phones, computers, and pagers. The servers further provide a connection to a traditional security central station, which can then contact authorities in the event of an alarm condition being detected by the SMA controller in the dwelling.

Figure 1:
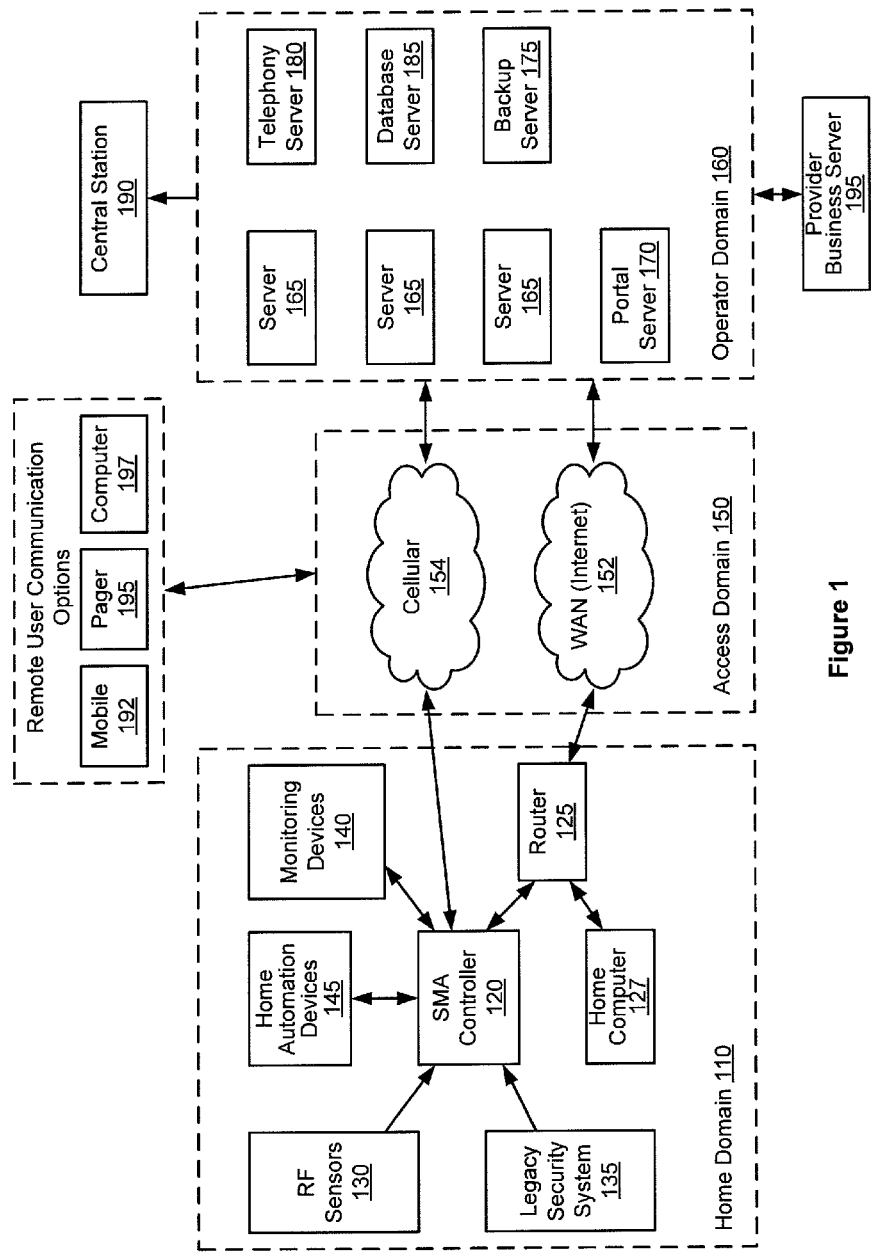
FIG. 1 is a simplified block diagram illustrating an architecture including a set of logical domains and functional entities within which embodiments of the present invention interact.

FIG. 1 is a simplified block diagram illustrating an architecture including a set of logical domains and functional entities within which embodiments of the present invention interact. A home domain 110 includes an embodiment of the SMA controller 120. The home domain is coupled via an access domain 150 to an operator domain 160 that includes various servers. The servers are in turn coupled to a central station alarm monitoring system 190 and to various remote user communication options. The servers are also coupled to a provider business server 195 for exchange of information of interest to business operations of the provider of SMA services. For example, inventory data can be exchanged from the operator domain to the provider business server, and information related to services purchased by a subscriber of SMA services can be exchanged to servers in the operator domain from the provider business server.

The home domain refers to a collection of security, monitoring and automation entities within a dwelling or other location having SMA devices. SMA controller 120 is a device that provides an end-user SMA interface to the various SMA entities (e.g., radio-frequency sensors) within home domain 110. SMA controller 120 further acts as a gateway interface between home domain 110 and operator domain 160. SMA controller 120 provides such gateway access to operator domain 160 via a network router 125. Network router 125 can be coupled to SMA controller 120 and to home network devices such as home computer 127 via either hard wired or wireless connections (e.g., WiFi, tethered Ethernet, and power-line network). A network router 125 coupled to a broadband modem (e.g., a cable modem or DSL modem) serves as one link to networks in access domain 150.

SMA devices within home domain 110 can include a variety of RF or wireless sensors 130 whose signals are received and interpreted by SMA controller 120. RF sensors 130 can include, for example, door or window sensors, motion detectors, smoke detectors, glass break detectors, inertial detectors, water detectors, carbon dioxide detectors, and key fob devices. SMA controller 120 can be configured to react to a change in state of any of these detectors. In addition to acting and reacting to changes in state of RF sensors 130, SMA controller 120 also can be coupled to a legacy security system 135. SMA controller 120 controls the legacy security system by interpreting signals from sensors coupled to the legacy security system and reacting in a user-configured manner. SMA controller 120, for example, will provide alarm or sensor state information from legacy security system 135 to servers in operator domain 160 that may ultimately inform central station 190 to take appropriate action.

SMA controller 120 can also be coupled to one or more monitoring devices 140. Monitoring devices 140 can include, for example, still and video cameras that provide images that are viewable on a screen of SMA controller 120 or a remotely connected device. Monitoring devices 140 can be coupled to SMA controller 120 either wirelessly (e.g., WiFi via router 125) or other connections.

Home automation devices 145 (e.g., home area network devices having an automation interface) can also be coupled to and controlled by SMA controller 120. SMA controller 120 can be configured to interact with a variety of home automation protocols, such as, for example, Z-Wave and ZigBee.

Embodiments of SMA controller 120 can be configured to communicate with a variety of RF or wireless sensors and are not limited to the RF sensors, monitoring devices and home automation devices discussed above. A person of ordinary skill in the art will appreciate that embodiments of the present invention are not limited to or by the above-discussed devices and sensors, and can be applied to other areas and devices.

Embodiments of SMA controller 120 can be used to configure and control home security devices (e.g., 130 and 135), monitoring devices 140 and automation devices 145, either directly or by providing a gateway to remote control via servers in operator domain 160. SMA controller 120 communicates with servers residing in operator domain 160 via networks in access domain 150. Broadband communication can be provided by coupling SMA controller 120 with a network router 125, which in turn is coupled to a wide area network 152, such as a provider network or the Internet, via an appropriate broadband modem. The router can be coupled to the wide area network through cable broadband, DSL, and the like. Wide area network 152, in turn, is coupled to servers in operator domain 160 via an appropriate series of routers and firewalls (not shown).

SMA controller 120 can also include additional mechanisms to provide a communication with the operator domain. For example, SMA controller 120 can be configured with a cellular network transceiver that permits communication with a cellular network 154. In turn, cellular network 154 can provide access via routers and firewalls to servers in operator domain 160. Embodiments of SMA controller 120 are not limited to providing gateway functionality via cellular and dwelling-based routers and modems. For example, SMA controller 120 can be configured with other network protocol controllers such as WiMAX satellite-based broadband, direct telephone coupling, and the like.

Operator domain 160 refers to a logical collection of SMA servers and other operator systems in an operator's network that provide end-user interfaces, such as portals accessible to subscribers of the SMA service, that can configure, manage and control SMA elements within home domain 110. Servers in operator domain 160 can be maintained by a provider (operator) of subscriber-based services for SMA operations. Examples of providers include cable providers, telecommunications providers, and the like. A production server architecture in operator domain 160 can support SMA systems in millions of home domains 110.

Individual server architectures can be of a variety of types, and in one embodiment, the server architecture is a tiered Java2 Enterprise Edition (J2EE) service oriented architecture. Such a tiered service oriented architecture can include an interface tier, a service tier, and a data access logic tier. The interface tier can provide entry points from outside the server processes, including, for example, browser web applications, mobile web applications, web services, HTML, XHTML, SOAP, and the like. A service tier can provide a variety of selectable functionality passed along by the operator to the end user. Service tiers can relate to end user subscription levels offered by the operator (e.g., payment tiers corresponding to "gold" level service, "silver" level service and "bronze" level service). Finally the data access logic tier provides access to various sources of data including database servers.

FIG. 1 illustrates an example set of servers that can be provided in operator domain 160. Servers 165 can support all non-alarm and alarm events, heartbeat, and command traffic between the various servers and SMA controllers 120. Servers 165 can also manage end-user electronic mail and SMS notification, as well as integration with provider billing, provisioning, inventory, tech support systems, and the like.

A portal server 170 can provide various user interface applications, including, for example, a subscriber portal, a mobile portal, and a management portal. A subscriber portal is an end-user accessible application that permits an end-user to access a corresponding SMA controller remotely via standard web-based applications. Using such a subscriber portal can provide access to the same SMA functions that an interface directly coupled to the SMA controller would provide, plus additional functions such as alert and contact management, historical data, widget and camera management, account management, and the like. A mobile portal can provide all or part of the access available to an end-user via the subscriber portal. A mobile portal can be limited, however, to capabilities of an accessing mobile device (e.g., touch screen or non-touch screen cellular phones). A management portal provides an operator representative access to support and manage SMA controllers in home domains 110 and corresponding user accounts via a web-based application. The management portal can provide tiers of management support so that levels of access to user information can be restricted based on authorization of a particular employee.

Telephony server 180 can process and send information related to alarm events received from SMA controllers 120 to alarm receivers at monitoring central station 190. A server 165 that processes the alarm event makes a request to telephony server 180 to dial the central station's receiver and send corresponding contact information. Telephony server 180 can communicate with a plurality of central stations 190. Server 165 can determine a correct central station to contact based upon user account settings associated with the transmitting SMA controller. Thus, alarms can be routed to different central stations based upon user accounts. Further, accounts can be transferred from one central station to another by modifying user account information. Telephony server 180 can communicate with alarm receivers at central station 190 using, for example, a security industry standard contact identification protocol (e.g., dual-tone multi-frequency [DTMF]) and broadband protocols.

In addition to supplying alarm event information to a central station 190, servers in operator domain 160 can communicate other information to the central station, including zone and sensor configuration and account information. Such account and configuration information allows the central station to relate a sensor alarm event with a specific account holder and the sensor alarm event with defined zones and sensor types. This aids the central station in the formulation of an appropriate response to a sensor alarm event. Communication of such information, as will be discussed in greater detail below, can be performed by an appropriate server in the operator domain, using a number of communication protocols (e.g., a web service).

A backup server 175 can be provided to guarantee that an alarm path is available in an event that one or more servers 165 become unavailable or inaccessible. A backup server 175 can be co-located to the physical location of servers 165 to address scenarios in which one or more of the servers fail. Alternatively, a backup server 175 can be placed in a location remote from servers 165 in order to address situations in which a network failure or a power failure causes one or more of servers 165 to become unavailable. SMA controllers 120 can be configured to transmit alarm events to a backup server 175 if the SMA controller cannot successfully send such events to servers 165.

A database server 185 provides storage of all configuration and user information accessible to other servers within operator domain 160. Selection of a type of database provided by database server 185 can be dependent upon a variety of criteria, including, for example, scalability and availability of data. One embodiment of the present invention uses database services provided by an ORACLE database.

A server 165 in operator domain 160 provides a variety of functionality. Logically, a server 165 can be divided into the following functional modules: a broadband communication module, a cellular communication module, a notification module, a telephony communication module, and an integration module.

The broadband communication module manages broadband connections and message traffic from a plurality of SMA controllers 110 coupled to server 165. Embodiments of the present invention provide for the broadband channel to be a primary communication channel between an SMA controller 120 and servers 165. The broadband communication module handles a variety of communication, including, for example, all non-alarm and alarm events, non-event data transmission, broadband heartbeat, and command of traffic between server 165 and SMA controller 120 over the broadband channel. Embodiments of the present invention provide for an always-on persistent TCP socket connection to be maintained between each SMA controller and server 165. A variety of protocols can be used for communications between server 165 and SMA controller 120 (e.g., XML over TCP, and the like). Such communication can be secured using standard transport layer security (TLS) technologies. Through the use of an always-on socket connection, servers 165 can provide near real-time communication between the server and an SMA controller 120. For example, if a user has a subscriber portal active and a zone is tripped within home domain 110, a zone fault will be reflected in near real-time on the subscriber portal user interface.

The cellular communication module manages cellular connections and message traffic from SMA controllers 120 to a server 165. Embodiments of the present invention use the cellular channel as a backup communication channel to the broadband channel. Thus, if a broadband channel becomes unavailable, communication between an SMA controller and a server switches to the cellular channel. At this time, the cellular communication module on the server handles all non-alarm and alarm events, and command traffic from an SMA controller. When a broadband channel is active, heartbeat messages can be sent periodically on the cellular channel in order to monitor the cellular channel. When a cellular protocol communication stack is being used, a TCP socket connection can be established between the SMA controller and server to ensure reliable message delivery for critical messages (e.g., alarm events and commands). Once critical messages have been exchanged, the TCP connection can be shut down thereby reducing cellular communication costs. As with broadband communication, XMPP can be the messaging protocol used for such communications. Similarly, such communication can be secured using TLS and SASL authentication protocols. Non-critical messages (e.g., non-event data transmission such as configuration or inventory data) between an SMA controller and a server can be sent using UDP. A compressed binary protocol can be used as a messaging protocol for such communications in order to minimize cellular costs for such message traffic. Such messages can be secured using an encryption algorithm, such as the tiny encryption algorithm (TEA). Cellular communication can be established over two network segments: the GSM service provider's network that provides a path between an SMA controller and a cellular access point, and a VPN tunnel between the access point and an operator domain data center.

A notification module of server 165 determines if and how a user should be notified of events generated by their corresponding SMA controller 120. A user can specify who to notify of particular events or event types and how to notify the user (e.g., telephone call, electronic mail, text message, page, and the like), and this information is stored by a database server 185. When events such as alarm or non-alarm events are received by a server 165, those events can be past asynchronously to the notification module, which determines if, who and how to send those notifications based upon the user's configuration.

The telephony communication module provides communication between a server 165 and telephony server 180. When a server 165 receives and performs initial processing of alarm events, the telephony communication module forwards those events to a telephony server 180 which in turn communicates with a central station 190, as discussed above.

The integration module provides infrastructure and interfaces to integrate a server 165 with operator business systems, such as, for example, billing, provisioning, inventory, tech support, and the like (e.g., provider business server 195). An integration module can provide a web services interface for upstream integration that operator business systems can call to perform operations like creating and updating accounts and querying information stored in a database served by database server 185. An integration module can also provide an event-driven framework for downstream integration to inform operator business systems of events within the SMA system.

A server in the operator domain is not limited to this set of communication modules and can include modules to provide a variety of communication tasks. For example, a communication module for transmitting and receiving data to and from a central station can be provided. Such a module can include appropriate APIs and other interfaces for communicating with a web service associated with the central station.

SMA Controller Architecture

Figure 2:
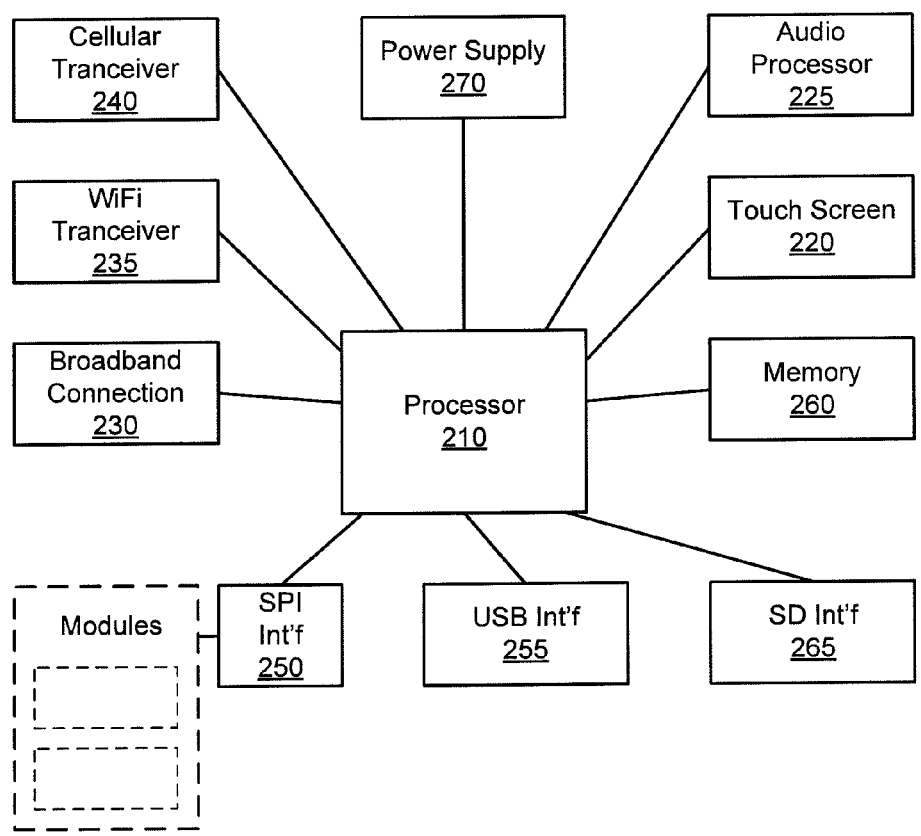
FIG. 2 is a simplified block diagram illustrating a hardware architecture of an SMA controller, according to one embodiment of the present invention.

FIG. 2 is a simplified block diagram illustrating a hardware architecture of an SMA controller, according to one embodiment of the present invention. A processor 210 is coupled to a plurality of communications transceivers, interface modules, memory modules, and user interface modules. Processor 210, executing firmware discussed below, performs various tasks related to interpretation of alarm and non-alarm signals received by SMA controller 120, interpreting reactions to those signals in light of configuration information either received from a server (e.g., server 165) or entered into an interface provided by SMA controller 120 (e.g., a touch screen 220). Embodiments of the present invention can use a variety of processors, for example, an ARM core processor such as a FREESCALE i.MX35 multimedia applications processor.

SMA controller 120 can provide for user input and display via a touch screen 220 coupled to processor 210. Processor 210 can also provide audio feedback to a user via use of an audio processor 225. Audio processor 225 can, in turn, be coupled to a speaker that provides sound in home domain 110. SMA controller 120 can be configured to provide a variety of sounds for different events detected by sensors associated with the SMA controller. Such sounds can be configured by a user so as to distinguish between alarm and non-alarm events.

As discussed above, an SMA controller 120 can communicate with a server 165 using different network access means. Processor 210 can provide broadband access to a router (e.g., router 125) via an Ethernet broadband connection PHY 130 or via a WiFi transceiver 235. The router can then be coupled to or be incorporated within an appropriate broadband modem. Cellular network connectivity can be provided by a cellular transceiver 240 that is coupled to processor 210. SMA controller 120 can be configured with a set of rules that govern when processor 210 will switch between a broadband connection and a cellular connection to operator domain 160.

In order to communicate with the various sensors and devices within home domain 110, processor 210 can be coupled to one or more transceiver modules via a bus, for example, a serial peripheral interface such as a SPI bus 250. Such transceiver modules permit communication with sensors of a variety of protocols in a configurable manner. Embodiments of the present invention can use a transceiver to communicate with a variety of RF sensors 130 using a variety of communication protocols. Similarly, home automation transceivers (e.g., home area network devices having an automation interface) that communicate using, for example, Z-Wave or ZigBee protocols can be coupled to processor 210 via the bus. If SMA controller 120 is coupled to a legacy security system 135, then a module permitting coupling to the legacy security system can be coupled to processor 210 via the bus. Other protocols can be provided for via such plug-in modules including, for example, digital enhanced cordless communication devices (DECT). In this manner, an SMA controller 120 can be configured to provide for control of a variety of devices and protocols known both today and in the future. In addition, processor 210 can be coupled to other types of devices (e.g., transceivers or computers) via a universal serial bus (USB) interface 255.

In order to locally store configuration information for SMA controller 120, a memory 260 is coupled to processor 210. Additional memory can be coupled to processor 210 via, for example, a secure digital interface 265. A power supply 270 is also coupled to processor 210 and to other devices within SMA controller 120 via, for example, a power management controller module.

SMA controller 120 is configured to be a customer premises equipment device that works in conjunction with server counterparts in operator domain 160 in order to perform functions required for security monitoring and automation. Embodiments of SMA controller 120 provide a touch screen interface (e.g., 220) into all the SMA features. Via the various modules coupled to processor 210, the SMA controller bridges the sensor network, the control network, and security panel network to broadband and cellular networks. SMA controller 120 further uses the protocols discussed above to carry the alarm and activity events to servers in the operator domain for processing. These connections also carry configuration information, provisioning commands, management and reporting information, security authentication, and any real-time media such as video or audio.

Figure 3:
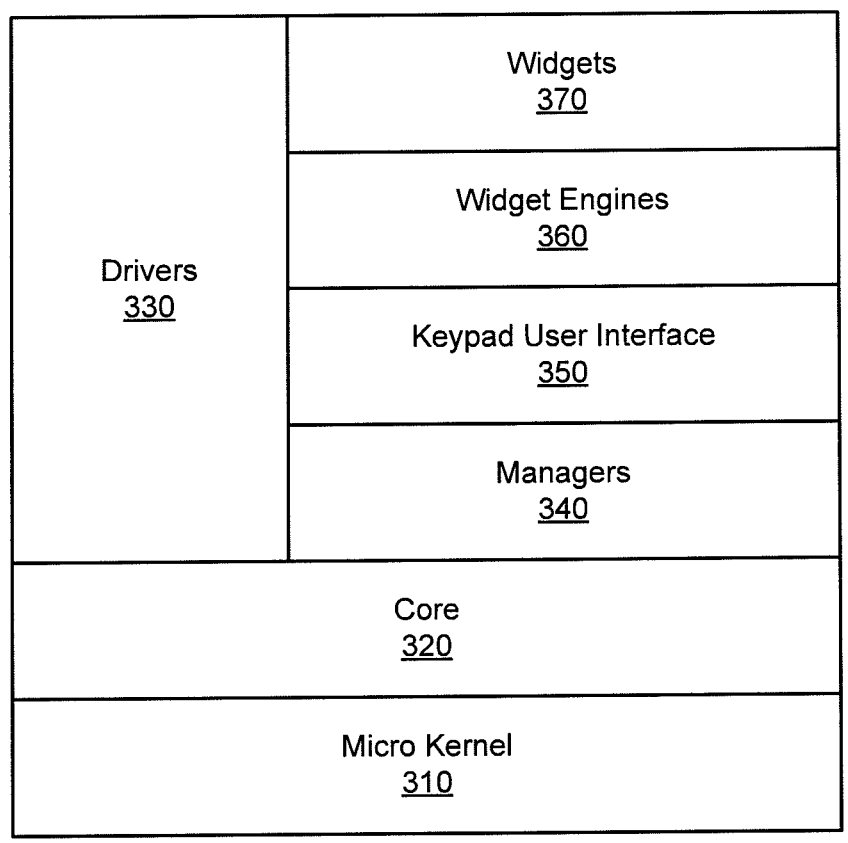
FIG. 3 is a simplified block diagram illustrating a logical stacking of an SMA controller's firmware architecture, usable with embodiments of the present invention.

FIG. 3 is a simplified block diagram illustrating a logical stacking of an SMA controller's firmware architecture, usable with embodiments of the present invention. Since SMA controller 120 provides security functionality for home domain 110, the SMA controller should be a highly available system. High availability suggests that the SMA controller be ready to serve an end-user at all times, both when a user is interacting with the SMA controller through a user interface and when alarms and other non-critical system events occur, regardless of whether a system component has failed. In order to provide such high availability, SMA controller 120 runs a micro-kernel operating system 310. An example of a micro-kernel operating system usable by embodiments of the present invention is a QNX real-time operating system. Under such a micro-kernel operating system, drivers, applications, protocol stacks and file systems run outside the operating system kernel in memory-protected user space. Such a micro-kernel operating system can provide fault resilience through features such as critical process monitoring and adaptive partitioning. As a result, components can fail, including low-level drivers, and automatically restart without affecting other components or the kernel and without requiring a reboot of the system. A critical process monitoring feature can automatically restart failed components because those components function in the user space. An adaptive partitioning feature of the micro kernel operating system provides guarantees of CPU resources for designated components, thereby preventing a component from consuming all CPU resources to the detriment of other system components.

A core layer 320 of the firmware architecture provides service/event library and client API library components. A client API library can register managers and drivers to handle events and to tell other managers or drivers to perform some action. The service/event library maintains lists of listeners for events that each manager or driver detects and distributes according to one of the lists.

Driver layer 330 interacts with hardware peripherals of SMA controller 120. For example, drivers can be provided for touch screen 220, broadband connection 230, WiFi transceiver 235, cellular transceiver 240, USB interface 255, SD interface 265, audio processor 225, and the various modules coupled to processor 210 via SPI interface 250. Manager layer 340 provides business and control logic used by the other layers. Managers can be provided for alarm activities, security protocols, keypad functionality, communications functionality, audio functionality, and the like.

Keypad user interface layer 350 drives the touch screen user interface of SMA controller 120. An example of the touch screen user interface consists of a header and a footer, widget icons and underlying widget user interfaces. Keypad user interface layer 350 drives these user interface elements by providing, for example, management of what the system Arm/Disarm interface button says and battery charge information, widget icon placement in the user face area between the header and footer, and interacting with widget engine layer 360 to display underlying widget user interface when a widget icon is selected.

In embodiments of the present invention, typical SMA controller functions are represented in the touch screen user interface as widgets (or active icons). Widgets provide access to the various security monitoring and automation control functions of SMA controller 120 as well as providing support for multi-media functionality through widgets that provide, for example, news, sports, weather and digital picture frame functionality. A main user interface screen can provide a set of icons, each of which represents a widget. Selection of a widget icon can then launch the widget. Widget engine layer 360 includes, for example, widget engines for native, HTML and FLASH-based widgets. Widget engines are responsible for displaying particular widgets on the screen. For example, if a widget is developed in HTML, selection of such a widget will cause the HTML widget engine to display the selected widget or touch screen 220. Information related to the various widgets is provided in widget layer 370.

Figure 4:
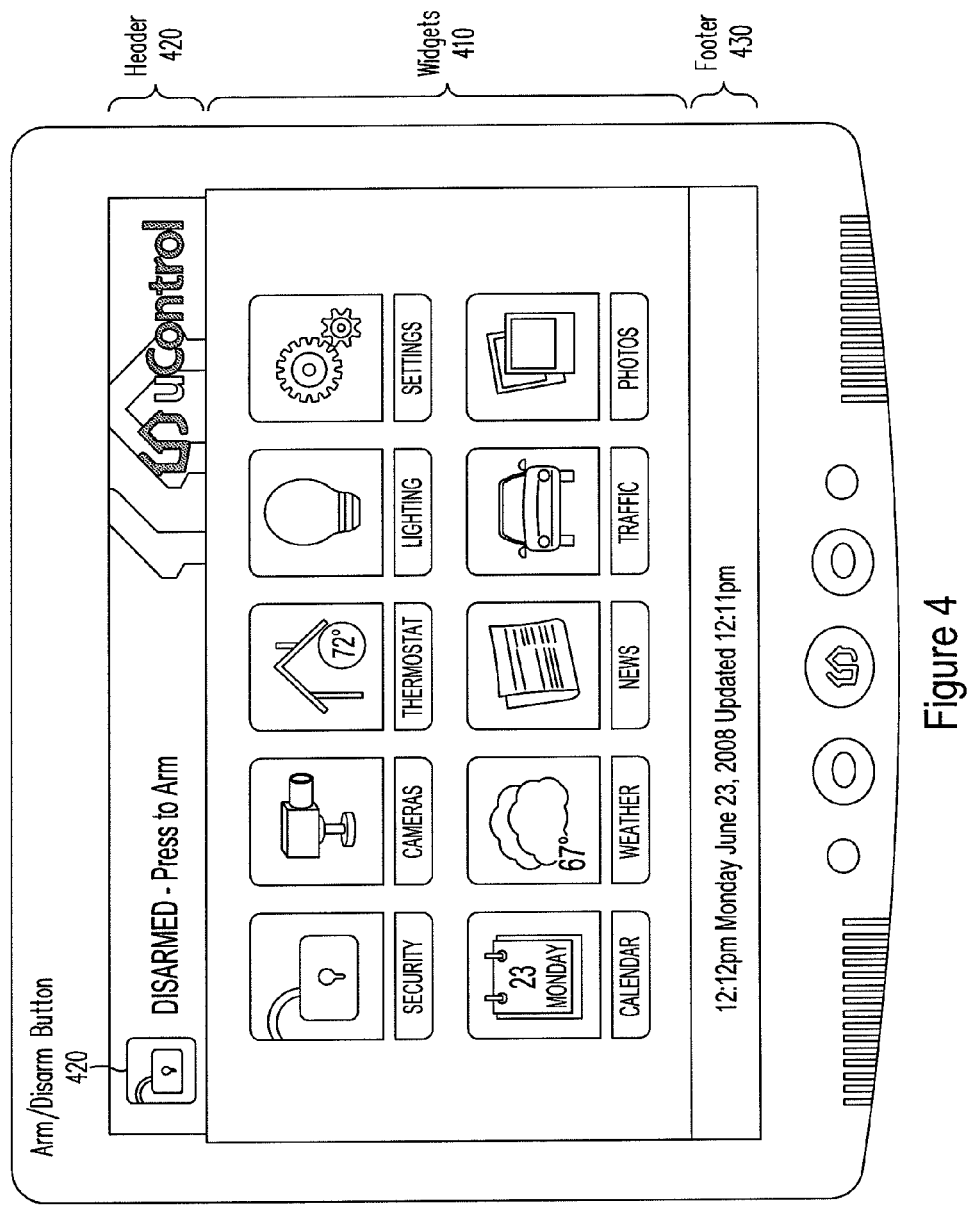
FIG. 4 is an illustration of an example user interface for an SMA controller 120, according to an embodiment of the present invention.

FIG. 4 is an illustration of an example user interface for an SMA controller 120, according to an embodiment of the present invention. The illustrated user interface provides a set of widget icons 410 that provide access to functionality of SMA controller 120. As illustrated, widgets are provided to access security functionality, camera images, thermostat control, lighting control, and other settings of the SMA controller. Additional widgets are provided to access network-based information such as weather, news, traffic, and digital picture frame functionality. A header 420 provides access to an Arm/Disarm button 425 that allows for arming the security system or disarming it. Additional information can be provided in the header, such as, for example, network status messages. A footer 430 can provide additional status information such as time and date, as displayed.

A user can select widgets corresponding to desired functionality. Embodiments of the present invention provide for access to widgets via portal server 170. A provider of operator domain 160 can determine functionality accessible to users, either for all users or based upon tiers of users (e.g., subscription levels associated with payment levels). A user can then select from the set of accessible widgets and the selected widgets will be distributed and displayed on the user interface of SMA controller 120. Configurability of SMA controller 120 is also driven by user determined actions and reactions to sensor stimulus.

SMA Controller Configurability

In accord with embodiments of the present invention, SMA controller 120 can be configured by a user in order to provide desired functionality in home domain 110. In addition to the hardware configurable options discussed above (e.g., modules coupled to SPI interface 250), SMA controller 120 provides for additional configuration through the use of software and/or firmware. For example, SMA controller 120 can be configured to receive signals from a variety of security sensors (e.g., RF sensors 130) and to associate those sensors with the physical environment of home domain 110 (e.g., through the use of defined zones). In addition, SMA controller 120 can be configured to receive still and video information from one or more cameras, provide a variety of programs and utilities to a user, and is configurable to communicate with a variety of home automation devices.

Figure 5:
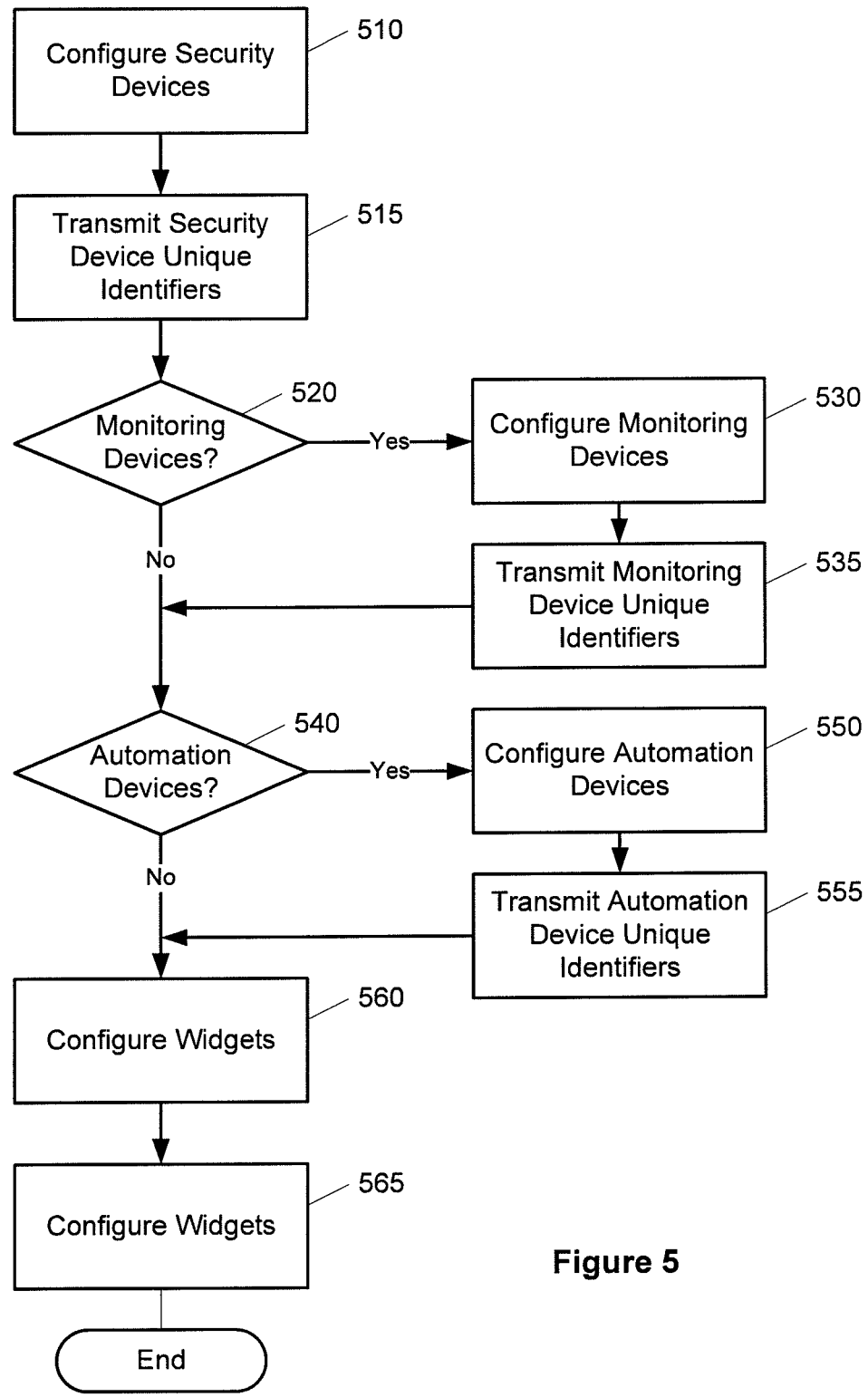
FIG. 5 is a simplified flow diagram illustrating steps performed in a configuration process of an SMA controller, in accord with embodiments of the present invention.

FIG. 5 is a simplified flow diagram illustrating steps performed in a configuration process of an SMA controller, in accord with embodiments of the present invention. Embodiments of an SMA controller will typically be configured with security sensor information, either from RF sensors 130 or from a legacy security system 135. Therefore, an SMA controller will be configured to access and interpret information related to those security sensors (510). As security sensors are configured, unique identifiers and types of each sensor are gathered and stored by the SMA controller. Subsequent to configuration of the sensors, the SMA controller can transmit a listing of sensor identifiers and types to a server 165 in operator domain 160 (515). This listing can then be provided by the server to a provider business server 195 to aid in inventory tracking by the provider.

A determination can then be made as to whether or not a user is including security cameras in home domain 110 (520). If cameras are included in the home domain, then a series of steps related to camera configuration is performed (530). As with security sensors, subsequent to configuration of monitoring devices a listing of monitoring device identifiers and types can be sent to a server in the operator domain (535). Similarly, a determination can be made as to whether or not home automation devices are to be controlled by the SMA controller (540). If so, then a series of steps can be performed to configure the SMA controller to access those home automation devices (550) and, subsequently, a listing of home automation devices can be provided to an operator domain server (555).

A user can then perform steps necessary to configuring widgets accessible via the SMA controller (560). As discussed above, the user may access a portal server (e.g., 170) to select and configure those widgets that are desirable to be accessed at SMA controller 120. A provider can also choose to keep track of those widget programs installed on an SMA controller by having a listing of such programs be transmitted to a server in the operator domain (565). Once these configuration steps are performed, the SMA controller can be made available to perform tasks related to securing, monitoring, and providing automation control to home domain 110.

SMA controller 120 can be configured to receive and interpret signals from a variety of security sensors. Such sensors can include, for example, door/window sensors that can detect opening and closing of a door or window, motion detectors that can detect movement in an area of interest, smoke detectors, glass break detectors, inertia detectors, and key fobs. In order to usefully interpret signals from such detectors, embodiments of SMA controller 120 can search for signals from such sensors and be configured with information related to the location and tasks of those sensors.

Figure 6:
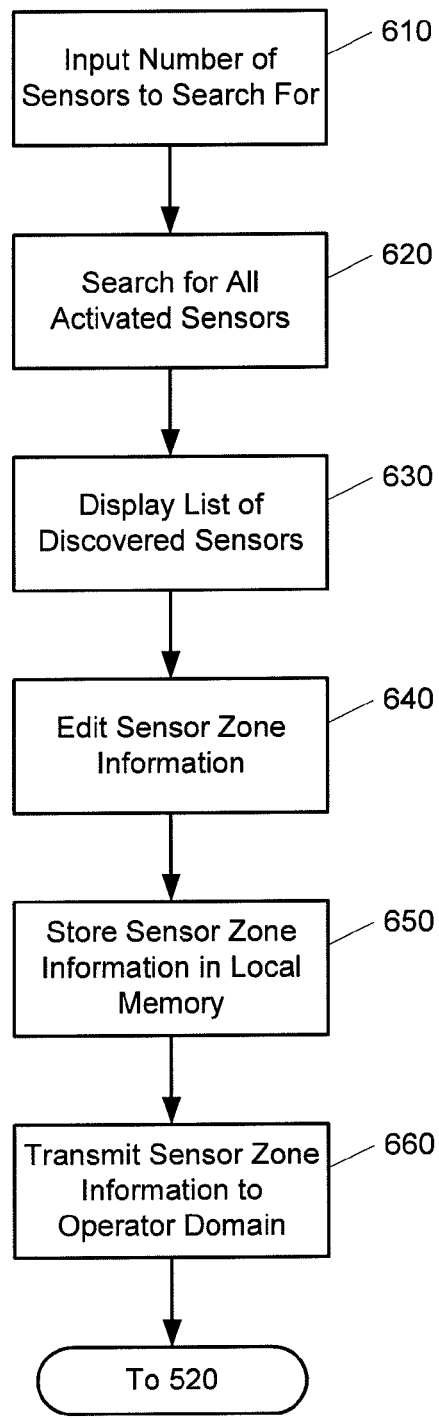
FIG. 6 is a simplified flow diagram illustrating steps performed in configuring security sensors (e.g., 510), in accord with embodiments of the present invention.

FIG. 6 is a simplified flow diagram illustrating steps performed in configuring security sensors (e.g., 510), in accord with embodiments of the present invention. A user of a security system incorporating SMA controller 120 (e.g., an owner or resident of home domain 110) can decide, based upon the needs within the home domain, the types and number of security sensors needed to secure the home domain. SMA controller 120, via a touch screen input device, for example, can be told how many such sensors to search for (610). The SMA controller can then search for all activated sensors providing a linking message to the SMA controller (620). Such a linking message can provide sensor information including, for example, a unique identification number for the sensor and sensor type information. A touch screen interface for SMA controller 120 can then provide to the user a display indicating information related to all sensors found during the search (630). This information, related to identification and type of sensors, can be provided to the operator domain (e.g., to aid in inventory tracking (515)).

Once presented with information related to all the located sensors, a user can then edit that information to provide specifics as to physical, or zone, location of the sensor within the home domain and other characteristics related to the zone of the sensor (640). For example, a touch screen display 220 coupled to SMA controller 120 can provide a list of all located sensors from which the user can select a specific sensor to define or edit information related to that sensor. The information related to the sensors and zones is then stored in a local memory of the SMA controller 120 (e.g., memory 260) (650). The SMA controller can also transmit the sensor zone information to be stored in a server in operator domain 160 via an available broadband connection (660).

Figure 7:
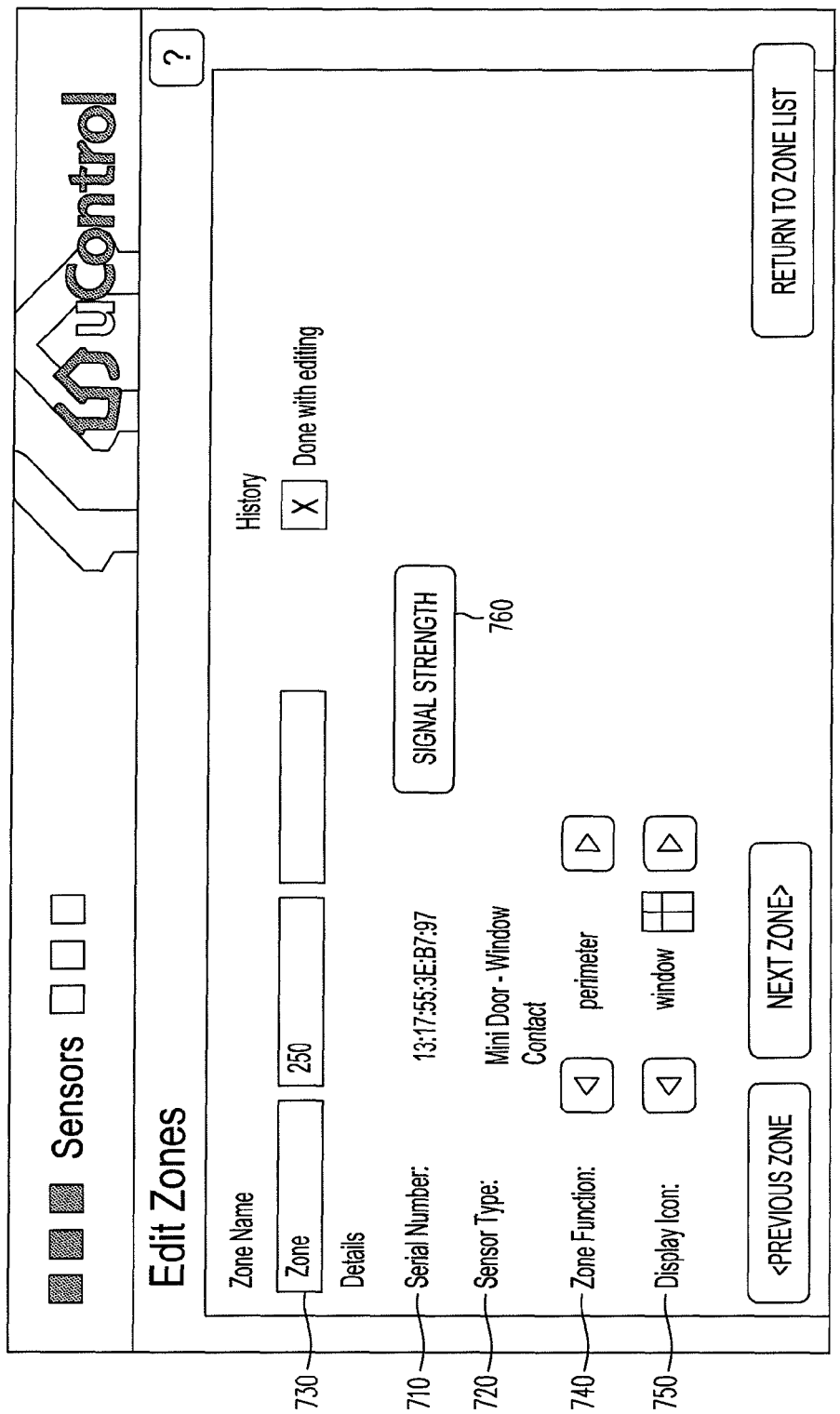
FIG. 7 is an illustration of a display that can be provided by embodiments of the present invention to permit editing of sensor information (e.g., sensor zone information).

FIG. 7 is an illustration of a display that can be provided by embodiments of the present invention to permit editing of sensor information (e.g., sensor zone information). As illustrated, the display can provide information such as the unique identifier of the sensor (serial number 710) and the sensor type (sensor type 720). As indicated above, unique identifier and sensor type information is provided by the sensor during the search and location process. Through a display such as that illustrated in FIG. 7, a user can define additional zone characteristics related to the sensor. For example, a user can define or select a zone name 730 to associate with the sensor. Such a zone name can be entered by a user through the use of a touch screen-based keyboard or selected from a list of common names displayed on the touch screen.

A zone function 740 can also be provided to be associated with the sensor. A zone function determines behavior of the zone and is dependent on the zone type. For example, a door/window sensor can function as an entry/exit zone or as a perimeter zone. Each zone type can have one or more configurable zone functions. For example, a motion detector can have a zone function of interior follower, a smoke/heat detector can have a zone function of 24-hour fire monitoring, a glass break detector can have a zone function of a perimeter zone, and an inertia detector can have an entry/exit zone function or a perimeter zone function.

Selection of a zone function definition alters how the security system acts and reacts to signals received from a sensor in that zone. The following table illustrates examples of zone functions and their associated action/reaction definitions.

TABLE 1

| Zone Function | Definition |
| --- | --- |
| Entry/Exit | Allow exiting the home domain when the system is arming and will begin an entry delay when opened if the system is armed. Zone can be bypassed and can have specific tones assigned for open and close events. |
| Perimeter | Generate an alarm immediately if tripped while the system is armed. Can be bypassed and can have specific tones assigned for open and close events. |
| Interior Follower | Protect the internal spaces of the home domain and trigger an immediate alarm if the system is armed in away mode. Zone is not armed when the system is in armed stay mode. Can be bypassed and can have specific activity/non activity tones assigned. |
| 24-Hour Fire | Generate an immediate fire alarm if triggered. Zone cannot be bypassed. |
| 24-Hour Monitor | Generate notifications in the home and will beep the keypad but will not sound the full alarm. Can be bypassed. |
| 24-Hour Environmental | Generates notifications, beeps keypads, and sounds the siren to let people within the home domain know to evacuate the premises. Cannot be bypassed. |
| 24-Hour Inform | Will never generate an alarm, even if the system is armed. Upon triggering of the sensor will make the configured sound and send events to the operator domain. Can be bypassed. |

By defining such zones, a user can control how the security functions of SMA controller 120 react to various sensor triggers.

A user can also configure a display icon 750 associated with the sensor zone. In many cases, the available icons will be limited to one type of icon that graphically relates to the sensor type. But, for example, with a door/window sensor, icons can be made available that illustrate a door or a window as appropriate. FIG. 7 further illustrates a signal strength button 760 that, when selected, can illustrate strength of the signal between the wireless hub located within SMA controller 120 and the associated sensor.

The sensor zone information entered through the use of a display such as that illustrated in FIG. 7, can be stored in local data tables that are stored in memory 260 of SMA controller 120 (650). In addition, sensor zone information can also be transmitted via access domain 150 to servers in operator domain 160 for storage (e.g., database server 185) (660). By storing the sensor zone information in servers in the operator domain, the information is available to a user accessing a portal server 170. A user could then edit the sensor zone information through use of the portal rather than the SMA controller interface. Further, sensor zone information stored on database server 185 is retained even if an SMA controller suffers from an event that makes the SMA controller unusable. In such an event, a new SMA controller can be installed in home domain 110 and the information stored in operator domain 160 can be provided to the new SMA controller. This eliminates a need to manually reconfigure the new SMA controller with all sensor information. In addition to being available to the portal server, the stored sensor zone information can also be made available to other systems outside the operator domain, as desired (e.g., provider business server 195 and central station 190).

Figure 8:
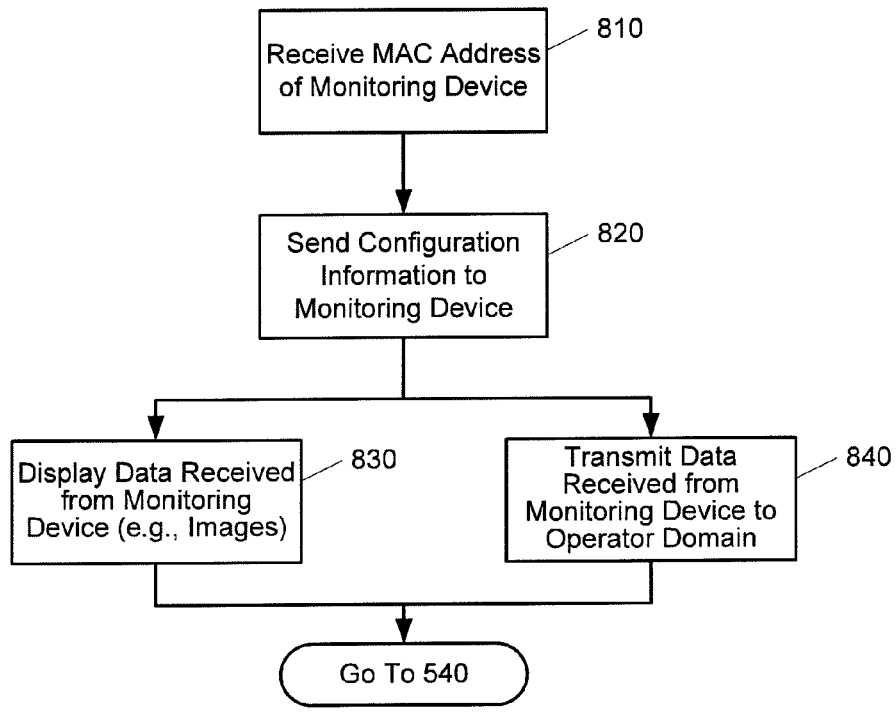
FIG. 8 is a simplified flow diagram illustrating steps performed to configure a home domain monitoring device, in accord with embodiments of the present invention.

FIG. 8 is a simplified flow diagram illustrating steps performed to configure a home domain monitoring device, in accord with embodiments of the present invention. As discussed above, SMA controller 120 can communicate with home domain monitoring devices 140, such as cameras and audio monitors. For example, a wireless camera can be activated and can communicate with SMA controller 120 via a router 125. During configuration, the SMA controller can detect the presence of a camera by receiving an MAC address of the camera from the router (810). The SMA controller can then configure the camera to communicate wirelessly with the router and the SMA controller (820). The SMA controller can pass a variety of information to the camera during a configuration phase, including, for example, an administrative user name and password, camera name, camera description, time zone, current time, language, user session name and password for list of users allowed to access the camera, network settings such as IP address and name servers, protocol settings, motion detection settings, and desired camera image settings such as resolution and video adjustments. In addition, the camera can provide information to the SMA controller for storage, such as, for example, device type, manufacturer, model number, and other control information. As discussed above, this type of information related to a monitoring device, such as a camera, can be provided to the operator domain (e.g., to aid in inventory tracking (535)).

Once the SMA controller and camera are configured, then images generated by the camera can be displayed on a display device associated with SMA controller 120 (830) or can be communicated to a portal server in operator domain 160 via a network in access domain 150 for display on a computer or mobile devices communicating with the portal server (840). SMA controller 120 can also store information related to the camera, such as, for example, a camera name, location of the camera, and relationship of the camera with a defined sensor zone. Embodiments of the present invention can provide both still and video images either on the SMA controller display or a portal display. An SMA controller can be configured to communicate with more than one monitoring device.

SMA controller 120 also has a capability of providing access to a variety of functionality through the use of widget programs. FIG. 4, discussed above, illustrates an example of a home screen display of SMA controller 120, showing a set of icons having associated widget programs (410). Some of the widgets provide for SMA controller functionality, such as, for example, security access, camera monitoring, and setting modification. Additionally, widgets can be provided to access SMA controller automation functionality such as thermostat control and lighting control. In addition, an SMA controller can provide display of user-selectable widgets (e.g., calendar, weather, news, traffic, and photos).

Figure 9:
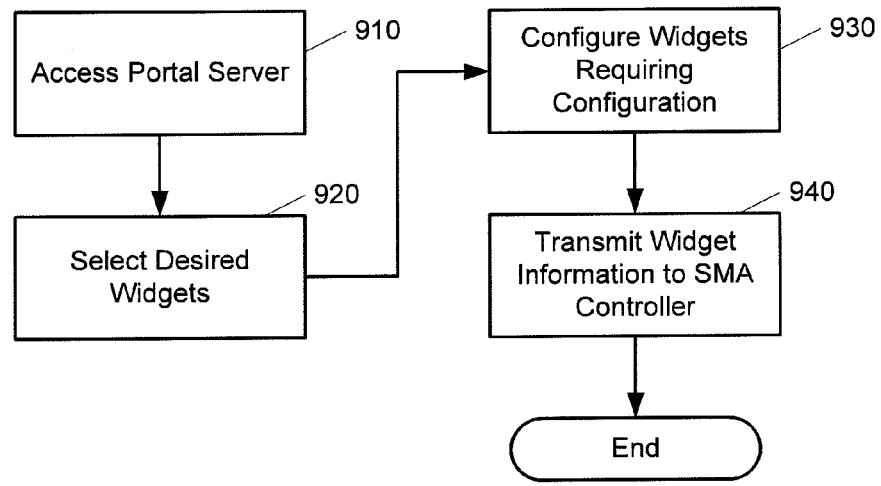
FIG. 9 is a simplified flow diagram illustrating steps performed in selecting widgets for use by an SMA controller, in accord with embodiments of the present invention.

FIG. 9 is a simplified flow diagram illustrating steps performed in selecting widgets for use by an SMA controller, in accord with embodiments of the present invention. A user can select those user selectable widget programs that are desired by accessing a portal server 170 (910). The user can view those widget programs that are available to the user and select those that the user wishes to install on the SMA controller (920). A user can also configure how the widget icons are displayed on the home screen (e.g., position of each icon) as well as provide any individual widget configuration information (e.g., zip code information for weather and traffic widgets) (930). Depending upon the purpose of a widget, a user may have a variety of options in configuring that widget.

By making widgets available on a portal server in the operator domain, the operator can control the nature and types of widgets available to a user. For example, an operator can define a series of option tiers for their users, with each tier having increasing numbers of available widgets or different type of widget functionality. Further, by making the widgets available through the portal, an operator can control the quality of the available widgets and ensuring that widgets will not affect the operability of SMA controller under the operator's control.

Once selected, code related to the widgets and widget setup information is transferred from servers in operator domain 160 to the associated SMA controller 120 in home domain 110 (940). That code information is stored in SMA controller 120, for example, in memory 260.

SMA controller 120 can also be configured to provide home automation functionality. As discussed above, a variety of hardware modules can be coupled to the SMA controller, allowing the SMA controller to communicate using protocols associated with those modules. In addition to the hardware configurability, SMA controller 120 is configured to communicate with a variety of devices selected to be controlled by the SMA controller. In a manner similar to that discussed above with regard to configuration of security sensors, SMA controller 120 is configured to detect available automated devices and display information regarding those devices. A user can then edit information about those devices and behavior of those devices through, for example, a touch screen interface coupled to SMA controller 120. In addition, a user can provide automation commands via accessing portal server 170 to modify those settings, or take immediate control of an automated device. Similarly, a user can take immediate control of automated devices from the touch screen of the SMA controller (e.g., through use of widgets such as "lights" and "thermostat," illustrated in FIG. 4). Configuration information related to the automated devices can be stored in a memory of SMA controller 120 or in a server located in operator domain 160. Also, the information regarding detected automated devices can be provided to the operator domain (e.g., 555)

In this manner, embodiments of the present invention provide configurable control over a variety of SMA devices in the home domain using a single controller. A variety of different device protocols can be provided for through the use of plug-in modules. Further flexibility is provided through configurable set up and control of security and automation devices. Additional functionality is provided through the use of user-selectable and user-configurable widgets.

Providing a Central Station with Account and Sensor Configuration Information

In order for a central station alarm monitoring system 190 to perform its task of identifying sensor alarm events and alerting appropriate responders, the central station needs sensor zone information as configured on an alarm system. In a traditional alarm system setup, the central station is informed of sensor zone information by an installation technician around the time of installation. This is typically accomplished by a telephone call or by a separate login to the central station by the installation technician. In addition, a provider of security services will separately contact a subscribed-to central station of account information and the like. Provision of subscriber account information in traditional systems is a two-step process involving entry of subscriber information into the provider's systems and then separate entry of the information into the central station's systems. These separate communications with the central station provider require additional resources, time, and effort on the part of the security system provider and the installation technician (e.g., at least twice the effort in providing subscriber information).

Embodiments of the present invention avoid this traditional approach by automatically providing account and sensor zone information from servers in operator domain 160 to a central station 190. As discussed above, an SMA controller can provide sensor zone information, including types and locations of sensors to servers in the operator domain for manipulation and storage. Servers in the operator domain also associate the sensor zone information with account information associated with the SMA controller as provided by, for example, a provider business server 195. The overhead associated with traditional methods of informing a central station of account and sensor zone information can be avoided by automatically providing information stored in the operator domain to a central station associated with the account, in a format required by the central station. In so doing, time and resource costs associated with having an installation technician provide sensor zone information or an administrative clerk providing account information to the central station are avoided.

Figure 10:
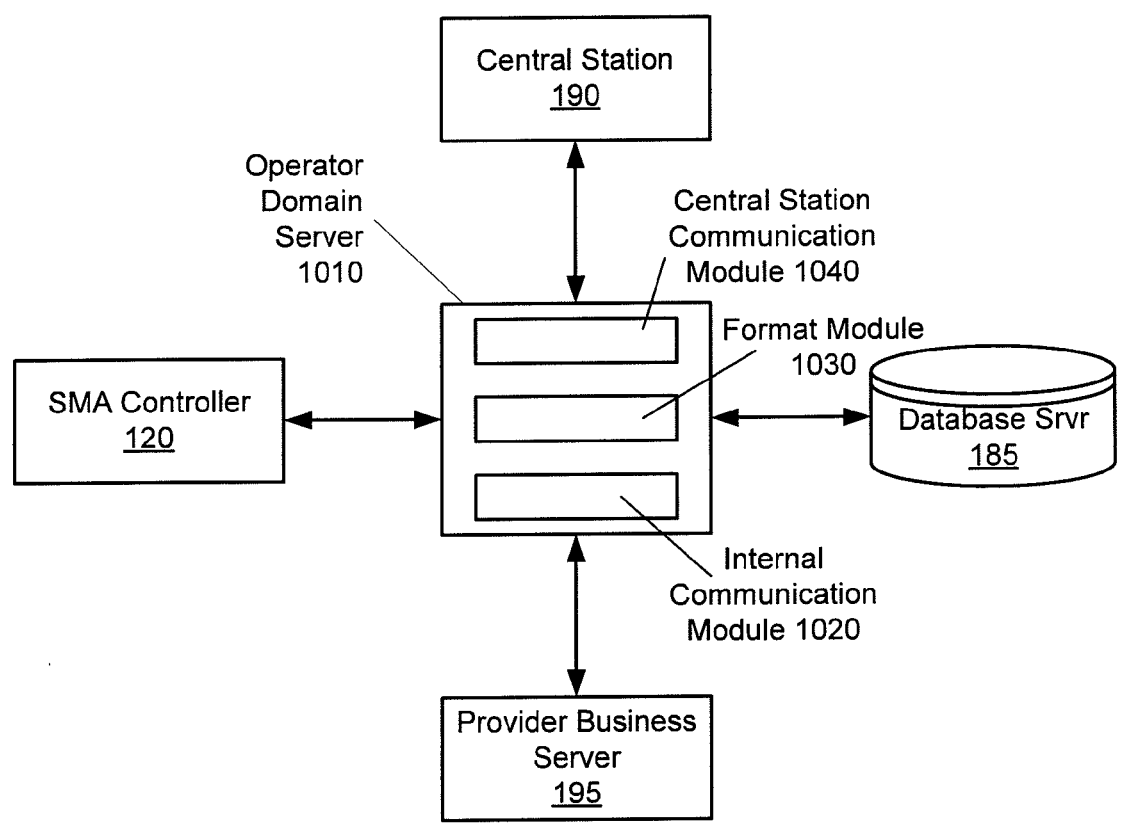
FIG. 10 is a simplified block diagram illustrating account and sensor zone data flow in accord with embodiments of the present invention.

FIG. 10 is a simplified block diagram illustrating account and sensor zone data flow in accord with embodiments of the present invention. FIG. 10 illustrates an operator domain server 1010 communicatively coupled with an SMA controller 120, database server 185, central station 190, and a provider business server 195. Operator domain server 1010 can be implemented by one or more of the servers illustrated in operator domain 160 of FIG. 1 (e.g., server 165, portal server 170, backup server 175, telephony server 180, and database server 185). As illustrated, operator domain server 1010 is configured to receive subscriber account-related information provided by a variety of sources, store all or part of that account-related information in a database, modify all or part of the account-related information to a format appropriate for the central station, and provide the formatted information to the central station.

For example, operator domain server 1010 can receive information associated with a new subscriber account from provider business server 195 through use of an internal communication module 1020. The new account information can be used to generate new records in database server 185. These records can include, for example, an account identifier, subscriber address, subscriber phone number, and an associated SMA controller identifier (e.g., a serial number or a unique network address). Operator domain server 1010 can be configured to select only the subscriber information necessary to generate a database record, or the provider business server can preconfigure the account information prior to sending that information to the operator domain server.

Operator domain server 1010 is further configured to provide the new account information to central station 190, in order to generate a new account associated with a subscriber at the central station. Format module 1030 can be configured to select the information required by the central station to create a new account is associated with the provider's subscriber. Further, format module 1030 can modify the data structure or format of the selected information to a form usable by central station 190 (e.g., proprietary formats for DICE and Micro Key central stations). Once formatted, the data can be provided to central station communication module 1040 for transmission to central station 190. Central station communication module 1040 can be configured to communicate with central station 190 using a variety of communication protocols, including, for example, a web service through an appropriate application program interface (API).

Another example of data communication flow through an operator domain server 1010 is provision of sensor zone information from an SMA controller 120 to central station 190. As discussed above, SMA controller 120 can provide configured sensor zone information to an operator domain server 1010. Such communication can occur through the use of a broadband communication module associated with the operator domain server, which can be a component of internal communication module 1020 or a separate communication module. The sensor zone configuration information can be stored by database server 185 and associated with an appropriate account identifier. As with the new account information, format module 1030 can select those parts of the sensor zone information necessary to identify sensors and associated zones at central station 190 and to place that information in a format recognized by the central station. Through the use of central station communication module 1040, this reformatted sensor zone information can be transmitted to central station 190 (e.g., using a web service or other network protocol).

As discussed above, through the use of a portal server 170 in operator domain 160, sensor zone information can be modified by a subscriber. Or sensor zone information can be modified through SMA controller 120 by adding or relocating or editing information related to sensors and zones. This includes not only modification of existing sensor information, but also adding new sensors and removing sensors, either by an installation technician or an end user of the SMA controller. Operator domain server 1010 can automatically provide not only new sensor zone configuration information to the central station but also sensor zone information that has been modified either by a user at the SMA controller or portal server. This updated or modified information can be identified as such when provided to the central station so that the central station can appropriately modify information stored thereon.

The above-described provision of new and modified account and sensor zone configuration information from a server in operator domain 160 to a central station 190 is performed automatically by embodiments of the present invention. Operator domain server 1010 can provide this information to the central station as the information is received, or the information can be provided periodically in the form of batches of information, as agreed to between the provider of operator domain services and the provider of central station services. This automatic provision of information eliminates the traditional need for a security services provider agent to contact the central station with new account information or an installation technician to communicate sensor zone information to the central station. This conserves time and resources for both the provider of the operator domain services and the provider of the central station.

It should be noted that operator domain server 1010 and the above-described modules can be collocated on a single server in operator domain 160 or distributed in servers throughout the operator domain, as shown in FIG. 1. Embodiments of the present invention are not limited to all the above-described functionality being provided by one server within the operator domain.

Figure 11:
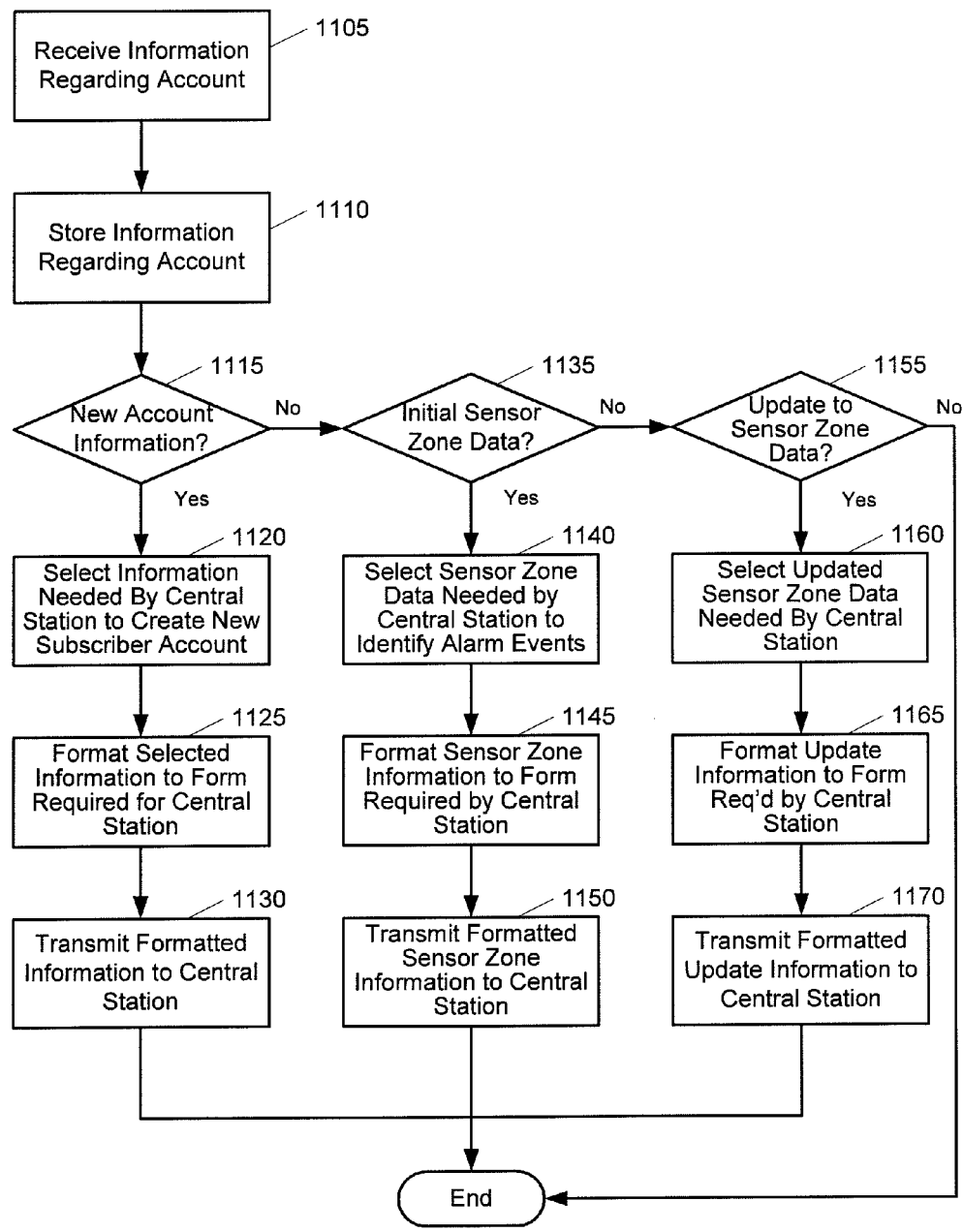
FIG. 11 is a simplified flow diagram illustrating steps performed by an operator domain server in providing information to a central station, in accord with embodiments of the present invention.

FIG. 11 is a simplified flow diagram illustrating steps performed by an operator domain server 1010 in providing information to a central station 190, in accord with embodiments of the present invention. The illustrative process begins with receipt of information regarding a subscriber account (1105). As discussed above, the received information can include new account information from, for example, a provider business server, configuration information for sensors and zones from an SMA controller, and modified sensor zone configuration information from an SMA controller or a portal server 170. The received information can then be stored (1110). Storage can be performed in one or more database records (e.g., in database server 185). Further, the received information can be processed in a manner appropriate for storing the information in the data repository.

A determination is made as to whether the received information is new subscriber account information (1115). Such a determination can be made before or after the storage of the information, as appropriate. If the received information is new account information, then the information can be processed to select subscriber account information needed by a central station to initiate a new account at the central station (1120). Once selected, that information can be formatted as required by the central station (1125). Such formatting can be performed, for example, by a format module 1030, as discussed above.

The formatted information is then transmitted to an appropriate central station 190 (1130). An operator domain server can be coupled to more than one central station in support of subscriber services. In this manner, an operator can choose a provider of central station services for customers based on a variety of criteria. Thus, an operator domain server can also select an appropriate central station to receive the formatted information based upon one or more fields in the received information regarding the new subscriber account. Further, different central stations may communicate using different protocols (e.g., DICE and Micro Key). Thus, a selection of central station to which to transmit the subscriber information will also impact selection of a format of information to provide to the central station as well as transmission protocol to the central station.

If the received account information is not related to new account information, but is instead determined to relate to an initial set of sensor zone information (1135), then a different set of steps is performed to prepare and transmit the sensor zone information to the central station. Selection of the sensor zone information needed by a central station in order to uniquely identify alarm-type sensor events (1140) is performed. The types of information provided to the central station is determined, at least in part, by the central station associated with the account linked to the sensor zone information. The selected sensor zone information can then be formatted as required by the central station (1145), again as determined by the associated central station requirements. The formatted information is then transmitted to the selected central station using an appropriate protocol associated with that central station (1150).

If it is determined that the received information is an update to sensor zone information (1155), then a selection of the updated sensor zone information is performed (1160). As with initial configuration of sensor zone information, a determination is made as to which information is required by the central station associated with the account linked to the sensor zone information. The selected sensor zone update information is formatted as required by the selected central station (1165). And finally, the formatted updated sensor zone information can be transmitted to the selected central station associated with the account (1170).

In addition to formatted account or sensor zone information, the operator domain server can also provide the central station with an identifier of the type of information that is being transmitted to the central station. That is, the identifier relates to whether the data being sent is new account information, initial sensor zone configuration information or updated sensor zone configuration information can be provided. This will allow the central station to respond accordingly to the type of information received. For example, if the information being provided to the central station relates to a new subscriber account, then a "create account" parameter can be provided to the central station indicating the expected action to be taken by the central station.

Through the use of the above exemplified method, embodiments of the present invention can automatically provide to a central station information related to accounts and sensor zone configuration without the need for an agent or an installation technician to intervene. Besides reducing the amount of labor and other overhead associated with human interaction to provide the information, the automatic provision of data from an operator domain server to the central station reduces the opportunity for data errors in both account information and sensor zone configuration information to be introduced.

An Example Computing and Network Environment

As shown above, the present invention can be implemented using a variety of computer systems and networks. An example of one such computing and network environment is described below with reference to FIGS. 12 and 13.

Figure 12:
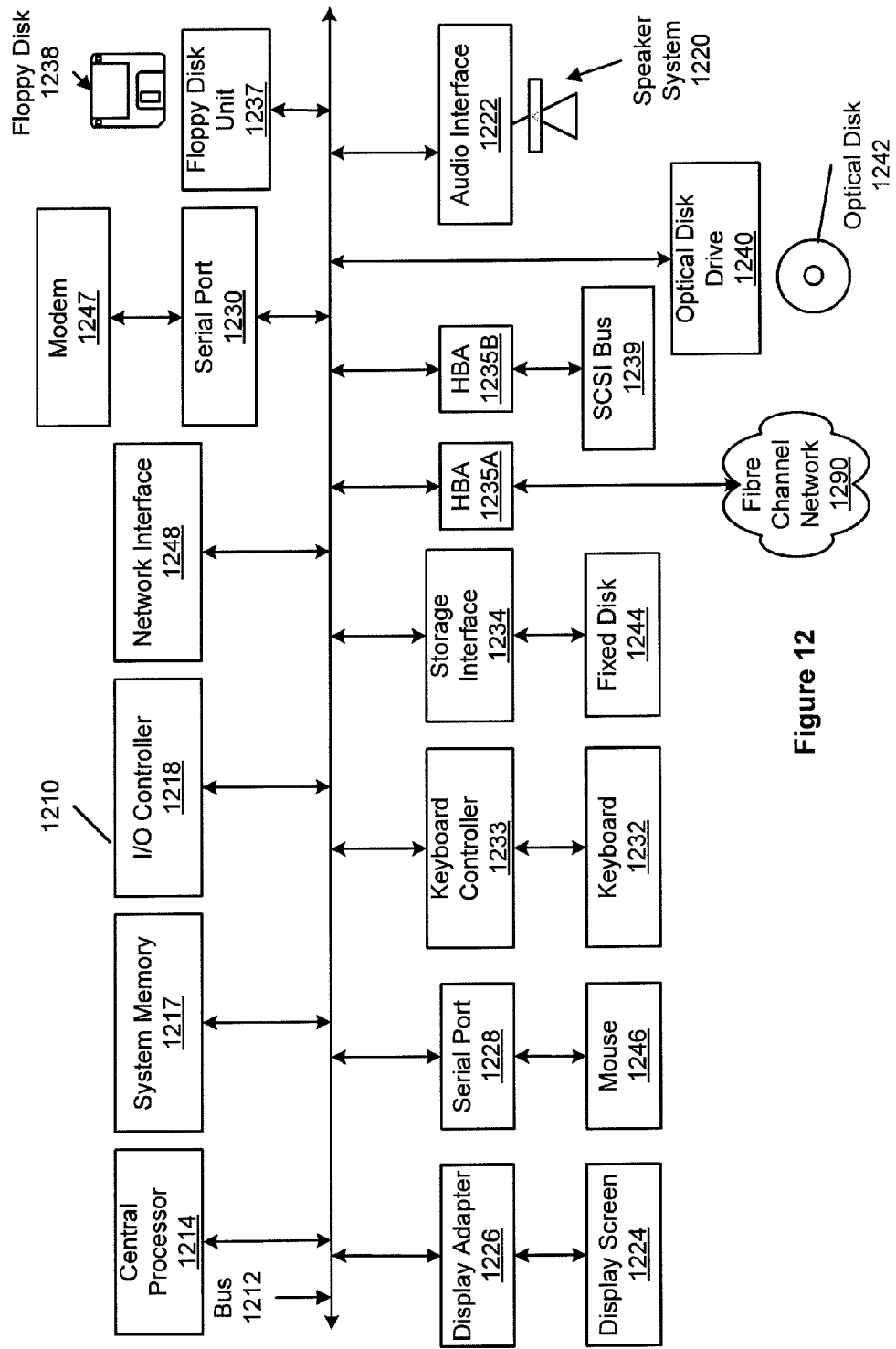
FIG. 12 is a simplified block diagram a computer system suitable for implementing embodiments of the present invention.

FIG. 12 depicts a block diagram of a computer system 1210 suitable for implementing aspects of the present invention (e.g., servers 165, portal server 170, backup server 175, telephony server 180, and database server 185). Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1210 are generally stored on and accessed via a computer-readable medium, such as a hard disk drive (e.g., fixed disk 1244), an optical drive (e.g., optical drive 1240), a floppy disk unit 1237, or other storage medium. Additionally, applications can be in the form of electronic signals modulated in accordance with the application and data communication technology when accessed via network modem 1247 or interface 1248.

Storage interface 1234, as with the other storage interfaces of computer system 1210, can connect to a standard computer-readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present invention. The devices and subsystems can be interconnected in different ways from that shown in FIG. 12. The operation of a computer system such as that shown in FIG. 12 is readily known in the art and is not discussed in detail in this application. Code to implement the present invention can be stored in computer-readable storage media such as one or more of system memory 1217, fixed disk 1244, optical disk 1242, or floppy disk 1238. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 13:
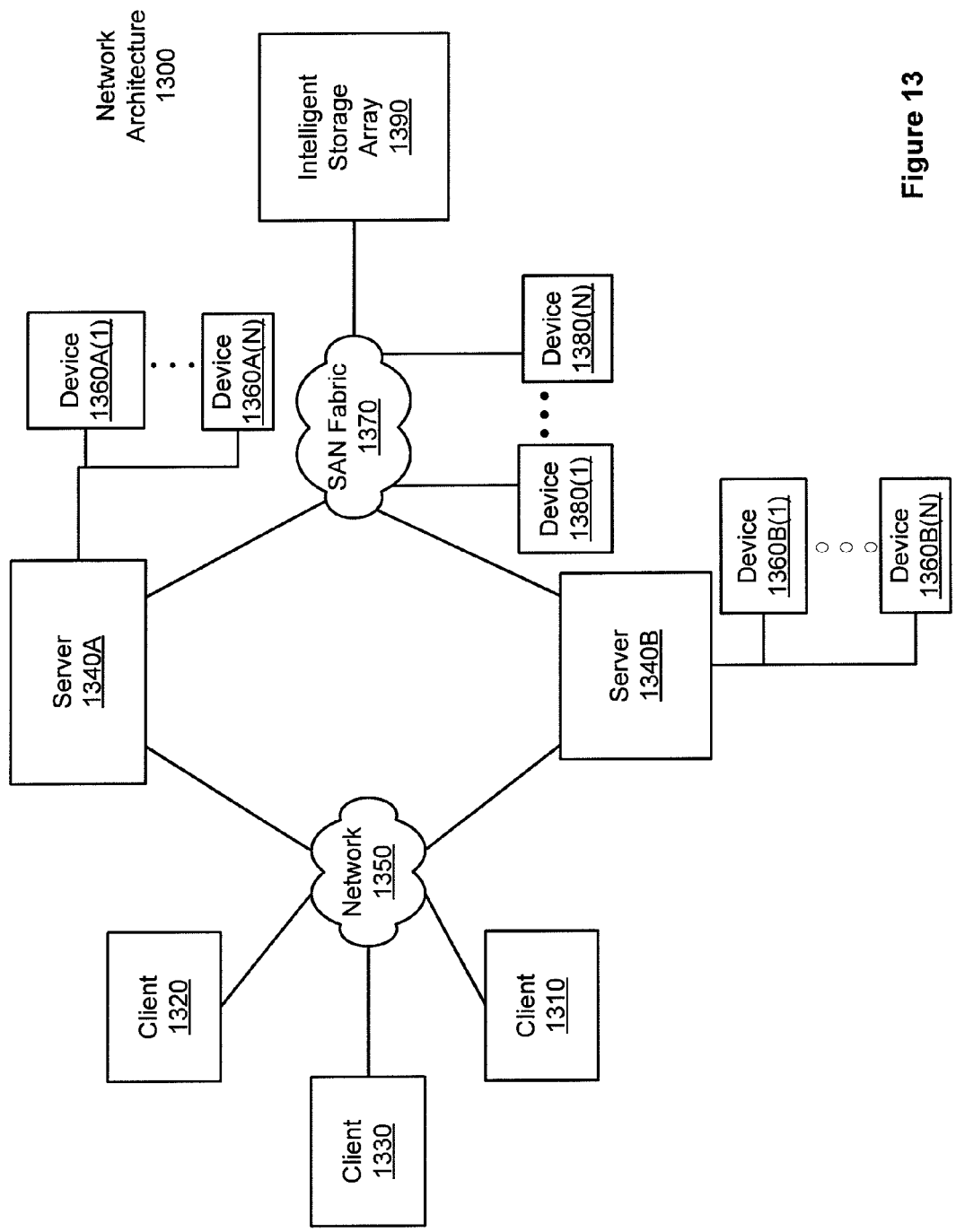
FIG. 13 is a simplified block diagram of a network architecture suitable for implementing embodiments of the present invention.

FIG. 13 is a block diagram depicting a network architecture 1300 in which client systems 1310, 1320 and 1330, as well as storage servers 1340A and 1340B (any of which can be implemented using computer system 1210), are coupled to a network 1350. Storage server 1340A is further depicted as having storage devices 1360A(1)-(N) directly attached, and storage server 1340B is depicted with storage devices 1360B(1)-(N) directly attached. Storage servers 1340A and 1340B are also connected to a SAN fabric 1370, although connection to a storage area network is not required for operation of the invention. SAN fabric 1370 supports access to storage devices 1380(1)-(N) by storage servers 1340A and 1340B, and so by client systems 1310, 1320 and 1330 via network 1350. Intelligent storage array 1390 is also shown as an example of a specific storage device accessible via SAN fabric 1370.

With reference to computer system 1210, modem 1247, network interface 1248 or some other method can be used to provide connectivity from each of client computer systems 1310, 1320 and 1330 to network 1350. Client systems 1310, 1320 and 1330 are able to access information on storage server 1340A or 1340B using, for example, a web browser or other client software (not shown). Such a client allows client systems 1310, 1320 and 1330 to access data hosted by storage server 1340A or 1340B or one of storage devices 1360A(1)-(N), 1360B(1)-(N), 1380(1)-(N) or intelligent storage array 1390. FIG. 13 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   receiving, over a first network coupling, sensor configuration information from a remote security, monitoring and automation (SMA) controller, wherein the sensor configuration information comprises one or more sensor identifiers and one or more zones associated with the one or more sensor identifiers, wherein the one or more zones is associated with a response of the SMA controller;
   storing the sensor configuration information;
   receiving, over a third network coupling, account configuration information from a remote server;
   associating the sensor configuration information with the account configuration information and translating the sensor configuration information and the account configuration information to a format compatible with a remote central station alarm monitoring system; and
   transmitting, over a second network coupling, the translated sensor configuration information and account configuration information to the remote central station alarm monitoring system.

2. The method of claim 1, wherein the storing comprises storing the sensor configuration information using a database record associated with an account identifier, wherein the account identifier identifies a subscriber associated with the SMA controller.

3. The method of claim 2, comprising:
   translating the account identifier associated with the SMA controller to an account identifier configured on the remote central station alarm monitoring system; and
   transmitting, over the second network coupling, the translated account identifier in association with the transmitting the translated sensor configuration information.

4. The method of claim 1, comprising performing the transmitting the translated sensor configuration information to the remote central station alarm monitoring system using a web service, wherein the translating comprises formatting and assembling the sensor configuration information to data usable by the remote central station alarm monitoring system.

5. The method of claim 1, comprising:
   receiving the account configuration information from a remote network node;
   storing the account configuration information;
   translating the account configuration information to a format compatible with the remote central station alarm monitoring system; and
   transmitting, over the second network coupling, the translated account configuration information to the remote central station alarm monitoring system.

6. The method of claim 5, wherein the account configuration information comprises:
   an account identifier;
   one or more account configuration parameters; and
   an SMA controller identifier associated with the account identifier.

7. The method of claim 6, wherein the account configuration parameters comprise one or more of account passwords, account secret words, and emergency contact information.

8. The method of claim 6, wherein the storing the account configuration information comprises:
   creating a new record for the account identifier, if the account configuration information is for an account identifier not previously stored; and
   modifying a previously stored record for the account identifier, if the account configuration information is for an account identifier previously stored.

9. The method of claim 8, wherein the storing the account configuration information comprises storing the account configuration information in a database record.

10. The method of claim 8, wherein the translating the account configuration information comprises including a new account create parameter for the remote central station alarm monitoring system, if the account configuration information is for an account identifier not previously stored.

11. A system comprising:
    a security, monitoring and automation (SMA) controller comprising a memory storing sensor configuration information associated with a plurality of security sensors coupled to the SMA controller, and a SMA controller network interface coupled to a first network coupling and configured to transmit the sensor configuration information using the first network coupling, wherein the sensor configuration information comprises a plurality of sensor identifiers each associated with a corresponding security sensor of the plurality of security sensors coupled to the SMA controller, wherein the sensor configuration information includes one or more zones associated with the plurality of sensor identifiers, wherein the one or more zones is associated with a response of the SMA controller; and
    a first computing node comprising a first network interface coupled to the first network coupling and configured to receive the sensor configuration information from the SMA controller, a storage volume storing the sensor configuration information, a third network interface coupled to a third network coupling and configured to receive account configuration information from a remote network node, wherein the first computing node associates the sensor configuration information with the account configuration information, and a second network interface coupled to a second network coupling and configured to transmit the sensor configuration information and account configuration information to a remote central station alarm monitoring system, wherein the sensor configuration information and account configuration information is in a format usable by the remote central station alarm monitoring system.

12. The system of claim 11, wherein the storage volume comprises a database storing the sensor configuration information in association with an account identifier, wherein the account identifier identifies a subscriber associated with the SMA controller.

13. The system of claim 12, wherein the first computing node comprises:
    a processor coupled to the first and second network interfaces and the storage volume;
    a memory coupled to the processor storing instructions executable by the processor, the instructions configured to translate the account identifier associated with the SMA controller to an account identifier configured on the remote central station alarm monitoring system; and
    the second network interface is configured to transmit the translated account identifier in association with transmitting the sensor configuration information.

14. The system of claim 11, wherein the first computing node comprises:
a third network interface coupled to a third network coupling and configured to receive account configuration information from a remote network node;
the storage volume storing the account configuration information; and
the second network interface configured to transmit the account configuration information to the remote central station alarm monitoring system, wherein the account configuration information is in a format usable by the remote central station alarm monitoring system.

15. The system of claim 14, wherein the account configuration information comprises:
an account identifier;
one or more account configuration parameters comprising one or more of account passwords, account secret words, and emergency contact information; and
an SMA controller identifier associated with the account identifier.

16. The system of claim 15, wherein the first computing node comprises:
a processor coupled to the first, second and third network interfaces and the storage volume;
a memory coupled to the processor storing instructions executable by the processor, the instructions configured to perform the storing of the account configuration information using instructions configured to create a new database record for the account identifier, if the account configuration information is for an account identifier not previously stored, and
modify a previously stored database record for the account identifier, if the account configuration information is for an account identifier previously stored.

17. An apparatus comprising:
a first network interface coupled to a first network coupling and configured to receive sensor configuration information from a remote security, monitoring and automation (SMA) controller, wherein the sensor configuration information comprises one or more sensor identifiers and one or more zones associated with the one or more sensor identifiers, wherein the one or more zones is associated with a response of the SMA controller;
means for storing the sensor configuration information;
means for receiving, over a third network coupling, account configuration information from a remote server;
means for associating the sensor configuration information with the account configuration information and translating the sensor configuration information and the account configuration information to a format compatible with a remote central station alarm monitoring system; and
a second network interface coupled to a second network coupling and configured to transmit the translated sensor configuration information and account configuration information to the remote central station alarm monitoring system.

18. The apparatus of claim 17, comprising means for storing the sensor configuration information using a database record associated with an account identifier, wherein the account identifier identifies a subscriber associated with the SMA controller.

19. The apparatus of claim 18, comprising:
means for translating the account identifier associated with the SMA controller to an account identifier configured on the remote central station alarm monitoring system; and
the second network interface configured to transmit the translated account identifier in association with the transmitting the translated sensor configuration information.

20. The apparatus of claim 17, comprising:
a third network interface coupled to a third network coupling and configured to receive account configuration information from a remote network node, wherein the account configuration information comprises an account identifier;
means for storing the account configuration information;
means for translating the account configuration information to a format compatible with the remote central station alarm monitoring system; and
the second network interface configured to transmit the translated account configuration information to the remote central station alarm monitoring system.

21. The apparatus of claim 20, wherein the means for storing the account configuration information comprises:
means for creating a new record for the account identifier, if the account configuration information is for an account identifier not previously stored; and
means for modifying a previously stored record for the account identifier, if the account configuration information is for an account identifier previously stored.

22. A method comprising:
receiving by a first network node, over a first network coupling, account configuration information including an account identifier from a remote network node coupled to the first network coupling;
storing the account configuration information in a memory coupled to the first network node;
selecting a subset of the account configuration information to transmit to a remote central station alarm monitoring system, wherein the subset of the account configuration information is sufficient to create a new subscriber account at the remote central station alarm monitoring system;
transmitting, over a second network coupling, the selected subset of the account configuration information to the remote central station alarm monitoring system coupled to the second network coupling;
receiving, over a third network coupling, sensor configuration information from a remote security, monitoring and automation (SMA) controller coupled to the third network coupling, wherein the sensor configuration information comprises one or more sensor identifiers and one or more zones associated with the one or more sensor identifiers, wherein the one or more zones is associated with a response of the SMA controller;
associating the sensor configuration information with the account configuration information;
storing the sensor configuration information in the memory in association with the account identifier; and
transmitting, over the second network, the associated account identifier and at least a portion of the sensor configuration information to the remote central station alarm monitoring system.

23. The method of claim 22, wherein the account configuration information comprises one or more account configuration parameters comprising one or more of account passwords, account secret words, and emergency contact information.

24. The method of claim 23, wherein the storing the account configuration information comprises:
> creating a new record for the account identifier, if the account configuration information is for an account identifier not previously stored; and
> modifying a previously stored record for the account identifier, if the account configuration information is for an account identifier previously stored.

25. The method of claim 22, wherein the account configuration information is received by the first network node as data entered by one or more of an agent or an end user.

\* \* \* \* \*